United States Patent [19]

Lepain et al.

[11] Patent Number: 4,469,603

[45] Date of Patent: Sep. 4, 1984

[54] SURFACE-ACTIVE COMPOSITIONS AND METHOD FOR DISPERSING OIL SLICKS

[75] Inventors: Andre Lepain, Rosieres; Alain G. R. Charlier, Overijse, both of Belgium

[73] Assignee: Cosden Technology, Inc., Dallas, Tex.

[21] Appl. No.: 405,791

[22] Filed: Aug. 6, 1982

[51] Int. Cl.$^3$ .............................................. E02B 15/04
[52] U.S. Cl. .................................... 210/749; 210/925; 252/312; 252/352; 252/354
[58] Field of Search ................ 210/925, 749; 252/354, 252/356, 312

[56] References Cited

U.S. PATENT DOCUMENTS

| | | | |
|---|---|---|---|
| 3,793,218 | 2/1974 | Canevari | 210/749 |
| 3,959,134 | 5/1976 | Canevari | 210/749 |
| 4,250,050 | 2/1981 | Asbeck et al. | 252/354 |

FOREIGN PATENT DOCUMENTS 1255395 12/1971 United Kingdom .
1404684 9/1975 United Kingdom .

*Primary Examiner*—Peter A. Hruskoci
*Assistant Examiner*—Sharon T. Cohen
*Attorney, Agent, or Firm*—Russell H. Schlattman; M. Norwood Cheairs

[57] ABSTRACT

Surface active compositions for dispersing oil slicks consisting essentially of specified proportions of a fatty acid sorbitan monoester, a polyalkyleneoxide adduct of a fatty acid sorbitan monoester, an aqueous solution of a dialkylsulfosuccinate salt, a glycol monoether and water and a method for dispersing an oil slick on water comprising applying a surface active composition of the above-described type to the surface of the oil slick.

27 Claims, No Drawings

SURFACE-ACTIVE COMPOSITIONS AND METHOD FOR DISPERSING OIL SLICKS

BACKGROUND OF THE INVENTION

The present invention relates to surface-active compositions for dispersing oil slicks. This invention is also directed to a method for treating and dispersing oil slicks.

Pollution of sea water by oil (crude oil or fractions of crude oil) occasioned by accidents, offshore drilling operations, discharge of ballast water or spillage from oil tankers, results in the formation of a continuous film or slick of oil which tends to continuously spread. This oily film is undesirable because it constitutes a barrier to the transfer of air and light from the atmosphere which are indispensable to support marine life.

One way of dealing with such pollution problems is to use oil collecting compositions. They are poured at the periphery of the oil slick, and they repel the oil which is gathered into a narrower area and may be removed by usual mechanical means. However, this oil-spill compression technique is only suitable on a relatively calm sea. Moreover, the compositions are only efficient during a very short period of time, due to the solubility of the compositions in the oil.

Another technique involves the use of surface-active agents which disintegrate the cohesive oily film into small droplets and disperse the droplets into the water column to a depth of several meters under the sea surface. The film is thus broken, and there is again a transfer of air and light from the atmosphere.

Some surface-active agents are highly effective as oil-spill dispersants, but their use has resulted in severe damage to marine life because they are too toxic towards aquatic flora and fauna. Other surface-active agents having a lower degree of toxicity are very often ineffective as oil dispersants in open seas. In fact, they are too quickly washed out by the water from the oil slick on which they are sprayed with the result that the droplets of oil coalesce or re-agglomerate and again form a slick.

For this reason, surface-active agents are generally used in admixture with a solvent, particularly a solvent having a low degree of toxicity, such as paraffinic and cycloparaffinic hydrocarbons and lower alcohols. The use of a solvent presents many advantages: it decreases the pour point of the composition, it reduces the viscosity of the oil forming the slick, it acts as a diluent for the surface-active agent which is more readily and uniformly distributed into the oil slick, and it reduces the time required to mix the dispersant agent and the oil.

Another problem which arises from the use of surface-active agents as oil spill dispersants is their water-solubility. Some of these agents dissolve too quickly in water and thus do not penetrate the oil slick. For this reason, it has been suggested to use dispersant compositions containing at least two surface-active agents. Better dispersion results from the use of blends of surface-active agents whose proportions are selected so that the hydrophilic-lipophilic balance (or HLB) falls between defined limits.

The trend therefore is to use blends of surface-active agents in admixture with a solvent. British Pat. No. 1,404,684 describes such a composition in which the oil slick dispersant comprises a blend of fatty acid polyoxyalkylene glycol esters and fatty acid sorbitan esters (HLB of the blend: from 9 to 10.5), dissolved in a hydrocarbon solvent containing less than 3 weight percent of aromatics. The solution may contain from 5 to 50 weight percent of the surfactant blend, a proportion of 8 to 10 weight percent being particularly preferred. Other patents describe the use of compositions comprising a fatty acid sorbitan monoester and a polyalkylene oxide adduct of fatty acid sorbitan monoester (British Pat. No. 1,255,394) or comprising these compounds in admixture with 25 to 35 volume percent (exclusive of solvent) of a 75% aqueous solution of dialkyl sulfosuccinate salt (U.S. Pat. No. 3,793,218). The best results in dispersing oil slicks are obtained in formulations containing about 40 percent of a blend of surface-active agents and about 60 percent of an isoparaffinic hydrocarbon solvent.

The use of a solvent presents the aforementioned advantages, but some problems may occur when dispersant blends are diluted by large amounts of solvent. Storage of compositions containing volatile solvents can increase the hazard of fire and lead to explosions. The presence of a large amount of solvent in the composition means that a lower amount of surface-active agent is available for dispersing the oil slick. Moreover, some volatile components of the solvent may be lost by evaporation when the composition is applied by spraying on the oil slick, particularly when the composition is applied from an aircraft or from a distant boat, and the advantages resulting from the incorporation of a solvent in the composition are partially lost.

In order to be effective in dispersing oil slicks, a surface-active composition in the form of a solution of surface-active agents should fulfill the following conditions:

have a high content in active agents,
have a sufficient and long-lasting dispersing action,
be a homogeneous and limpid liquid, free from insoluble material and from clouding,
be handleable at low temperatures and have an adequate viscosity, allowing the composition to be sprayed from boats or from aircraft without any increase in viscosity due to evaporation of volatile solvent during its application,
have a flash point higher than 61° C., to meet the regulations concerning the handling of chemical products,
be non-toxic and biodegradable,
be easily manufactured and at low cost.

SUMMARY OF THE INVENTION

It is an object of the present invention to provide a surface-active composition which fulfills the foregoing conditions.

Another object of the invention is to provide oil slick dispersant compositions which are homogeneous and limpid concentrated solutions of surface-active agents which remain stable on storage.

It is also an object of the invention to provide compositions which can be easily sprayed even at low temperatures.

Another object is to provide surface-active compositions which contain a solvent and which can be applied by spraying without loss of volatile material.

Still another object of the present invention resides in the provision of an improved method for effectively dispersing oil slicks.

It has now been found that compositions exhibiting unexpected advantageous characteristics in terms of oil-dispersing efficiency and other physical properties may be prepared when a large amount of a blend containing a sorbitan monoester of a fatty acid, a polyalkylene oxide adduct of a sorbitan monester of a fatty acid and a dialkyl sulfosuccinate salt is used in combination with a minor amount of a hydrocarbon-free aqueous solvent containing a monoether of a glycol, such as mono- or di-ethyleneglycol or propyleneglycol.

A surface-active composition for dispersing oil slicks according to the present invention consists essentially of from about 65 to 75 weight percent of a blend of a fatty acid sorbitan monoester, a polyalkyleneoxide adduct of a fatty acid sorbitan monoester and a 75% aqueous solution of an alkaline salt of a dialkyl sulfosuccinate, the weight percentage of said salt, based on dry salt and on the dry blend comprising from 35 to 40 percent and the weight ratio of fatty acid sorbitan monoester to polyalkylene oxide adduct comprising from about 60:40 to about 40:60, and from about 35 to 25 weight percent of a solvent mixture of water and a glycol monoether, the weight ratio of water to said ether comprising from about 60:40 to about 40:60, the total amount of water in said composition being at least 20 percent based on the total weight of said composition.

In accordance with another aspect of this invention, there is provided a method for dispersing oil slicks on water, comprising the step of applying a surface-active composition of the above-described type to the surface of the oil slick.

DETAILED DESCRIPTION OF PREFERRED EMBODIMENTS

The composition of this invention comprises a blend of surface-active agents in specified proportions, said blend being dissolved in a hydrocarbon-free solvent consisting of a mixture of specified proportions of water and glycol ether.

The fatty acid sorbitan monoester is generally an ester of an aliphatic monocarboxylic acid containing from 10 to 20 carbon atoms, such as oleic, lauric, palmitic or stearic acid or a mixture of these acids.

The polyalkyleneoxide adduct is obtained by reacting a fatty acid sorbitan monoester with ethylene oxide and/or propylene oxide. Generally, the adduct contains from 12 to 25 oxyethylene units or from 6 to 12 oxypropylene units per molecule.

The selection of these surface-active agents depends on their availability, price and purity. Generally, the preferred agents are sorbitan monooleate and its polyethylene oxide adduct containing an average of about 20 oxyethylene units per molecule.

The third component of the blend of surface-active agents is an alkaline salt of a dialkylsulfosuccinate, more particularly the sodium salt of di(2-ethylhexyl)sulfosuccinate which generally is commercially available in the form of a 75% aqueous solution.

The blend of these surface-active agents has a HLB ranging from about 9 to about 10.5, more particularly from about 9.4 to about 10.5.

The solvent for the blend of surface-active agents is a mixture of water and a monoalkyl glycol ether wherein the alkyl radical contains from 1 to 4 carbon atoms. Suitable glycol ethers include ethylene glycol monobutyl ether, diethylene glycol monobutyl ether, diethylene glycol monomethyl ether, dipropylene glycol monomethyl ether and the like.

It has been found that dispersant compositions comprising from about 65 to 75 weight percent of a blend of the above-mentioned surface-active agents, the rest of the composition being the solvent mixture, have particularly advantageous characteristics when the blend (as dry blend) contains from about 35 to about 40 weight percent of dry succinate and the composition contains at least 20 percent water, based on the total weight of composition. The total amount of water in the composition should not exceed about 27.5 percent.

When a hydrocarbon solvent is used instead of the aqueous solvent mixture or is added to the aqueous solvent, the resulting compositions are generally cloudy and exhibit a lower oil dispersing efficiency.

The compositions of the present invention may also contain a number of optional ingredients, such as nutrients, corrosion preventive agents and other usual additives. For example, it may be advantageous to add a pour point depressant, such as diethylene glycol, in an amount which generally does not exceed about 5 percent of the total weight of the composition.

The effectiveness of the dispersing compositions has been determined using the test method of Warren Spring Laboratory (Department of Trade and Industry, Stevenage, Herfordshire). In this test, the composition is added dropwise to a measured amount of oil floating on the surface of a column of sea water contained in a separating funnel. The funnel is then agitated to disperse the oil. The amount of oil which has been dispersed into the water column is determined after allowing the water column to stand at rest for a period of time. The effectiveness of a composition is expressed in terms of the percentage of the oil which has been dispersed into the water phase.

The test results given in the following examples illustrate the present invention. Unless otherwise stated, percentages are by weight.

The following abbreviations are used in the examples:
DOSS = sodium salt of di(2-ethylhexyl)sulfosuccinate
EGBE = ethylene glycol monobutyl ether
SMO = sorbitan monooleate
SMOE = ethoxylated sorbitan monooleate (about 20 moles of ethylene oxide)
DEG = diethylene glycol.

EXAMPLE 1

A blend of surface-active agents was prepared from SMO, SMOE and a 75% aqueous solution of DOSS. The weight percentages of these components (based on dry components) were respectively 34.5 for SMO, 28.3 for SMOE and 37.2 for DOSS. The HLB of this blend was 9.44.

A solvent mixture was prepared from water (48.2%) and EGBE (51.8%).

A composition containing 70.1% of this blend of surface-active materials and 29.9% of this solvent mixture had an effectiveness of 79.0%.

The overall water content of the composition (water in the aqueous solution of DOSS plus water in the solvent) was 22.15%, based on the weight of the composition.

For purposes of comparison, the following compositions also were prepared:

Comparative Composition A

Sixty-four percent of the foregoing blend of surface-active agents were dissolved in 36% of the foregoing solvent mixture. The effectiveness of Comparative Composition A was only 71.3%. This comparison shows that a composition containing less than 65% of the blend of surface-active agents is less effective. This means that the blend according to this invention does not require a large amount of the aqueous solvent of this invention to readily penetrate and disperse the oil slick.

Comparative Composition B

This composition was prepared by admixing 74.25% of a blend containing 38.5% SMO, 31.5% SMOE and 30% DOSS with 25.75% of the above-described solvent mixture. The effectiveness of Comparative Composition B was only 53.4%. This comparison shows that a composition prepared from a blend of surface-active materials containing less than 35% DOSS is less effective.

Comparative Composition C

This composition was prepared by admixing 75% of a blend containing 32.5% SMO, 26.6% SMOE and 40.9% DOSS with 25% of a solvent mixture containing 37.5% water and 62.5% EGBE. The proportion of water in this solvent mixture is above the limits specified in this invention. Moreover, the total amount of water in this composition is less than 20%, based on the total weight of composition. The effectiveness of Comparative Composition C was only 41.3%.

EXAMPLE 2

This example also illustrates the unexpected advantage resulting from the use of a composition containing at least 20% water based on the total weight of the composition.

A composition was prepared from the following components:

| SMO | 23.1% | |
|---|---|---|
| SMOE | 18.9% | |
| DOSS (75% aqueous soln.) | 32.15% | (24.11% of dry DOSS + 8.04% of H₂O) |
| H₂O | 12.85% | |
| EGBE | 13.0% | |

The HLB of this composition was 9.44. The percentage of dry DOSS in the blend of surface-active agents was 36.46% and the total water content of the overall composition was 20.89%. To this composition was added 3% DEG. The composition was limpid and its cloud point was −22° C.

By way of comparison, the same composition was prepared, except that the amount of water, based on the total weight of composition, was only 16%. Despite the addition of DEG, the composition was cloudy at 20° C.

EXAMPLE 3

The following compositions (see Table) were prepared and their main characteristics were determined.

TABLE

| Components | Compositions | | |
|---|---|---|---|
| | 1 | 2 | 3 |
| SMO | 20.9 | 18.0 | 15.2 |
| SMOE | 17.1 | 20.0 | 22.8 |
| DOSS (75% aqueous solution) | 30.0 | 30.0 | 30.0 |
| H₂O | 14.0 | 14.0 | 14.0 |
| EGBE | 15.0 | 15.0 | 15.0 |
| DEG | 3.0 | 3.0 | 3.0 |
| Appearance at 20° C. | limpid | limpid | limpid |
| Effectiveness | 78.0 | 77.4 | 75.3 |
| Viscosity (centistokes at −10° C.) | 519 | 527 | 559 |
| Cloud point (°C.) | −21 | −23 | −28 |
| Pour point (°C.) | −33 | −35 | <−40 |
| HLB | 9.44 | 9.96 | 10.45 |

In these compositions, the total amount of SMO+SMOE was kept constant, but the ratio of SMO to SMOE was respectively 55:45, 47.4:52.6 and 40:60.

By way of comparison, a similar composition was prepared except that the ratio of SMO to SMOE was 70:30. The effectiveness of this composition was only 18.1%.

EXAMPLE 4

Two compositions similar to composition 1 of Example 3 were prepared except that diethyleneglycol monobutyl ether and diethyleneglycol monomethyl ether were respectively substituted for EGBE. The effectiveness of these compositions was respectively 76.1% and 77.2%.

EXAMPLE 5

A composition was prepared from the following components:

| SMO | 20.9% |
|---|---|
| SMOE | 17.1% |
| DOSS (75% aqueous soln.) | 30.0% |
| H₂O | 17.0% |
| EGBE | 15.0% |

This composition was a limpid liquid which remained stable, without formation of crystals or other deposits on storage.

By way of comparison, a similar composition was prepared, except that an isoparaffinic hydrocarbon solvent was substituted for the mixture of H₂O and EGBE. This latter composition was cloudy and crystals were formed after 24 hours at 20° C.

A further comparative experiment was carried out with a composition containing the above-mentioned surface-active agents but which was free from any solvent. The effectiveness of said composition was less than 10%.

The results of the foregoing experiments carried out with compositions according to this invention and with comparative compositions show that the blend of surface-active agents must be dissolved in a solvent to be effective for dispersing an oil slick. It has also been found that a solvent consisting of a mixture of water and a glycol ether in the specified proportions gives unexpected results with regard to effectiveness, stability, pour point and cloud point.

The synergistic effect between the blend of surface-active agent and hydrocarbon-free solvent occurs only when:

(1) the blend of surface-active materials comprises from about 65 to about 75 wt % of the overall mixture;

(2) the blend of surface-active materials contains from 35 to 40% an alkaline salt of dialkylsulfosuccinate (as dry salt) based on the weight of dry blend; and (3) the solvent mixture, consisting of water and a glycol monoether, contains water in such an amount that the total water content of the overall composition is at least 20 weight percent.

Particularly advantageous compositions contain from about 70 to 75% of the blend of surface-active agents and from about 30 to 25% of the aqueous solvent mixture. A preferred surface-active blend comprises sorbitan monooleate and its polyoxyethylene adduct in a weight ratio corresponding to about 55:45.

These compositions are easily applied to an oil slick as a fine spray, even at low temperatures. The oil is rapidly dispersed under the influence of the wave action of the sea. In some cases, it may be advantageous to use mechanical agitation to improve the dispersion.

The compositions are free from volatile substances, and the viscosity of the compositions does not increase during spraying operations. The viscosity of the compositions of this invention is on the order of 475 to 575 centistokes at −10° C. These compositions are therefore easily applied to oil slicks by spraying from an aircraft or from a boat, even at low temperatures, without any increase of viscosity during the spraying operation.

The foregoing embodiments have been described merely to illustrate the invention and are not intended to be limiting. Since modifications of the disclosed embodiments incorporating the spirit and substance of the invention may occur to persons skilled in the art, the scope of the invention is to be limited solely with respect to the appended claims and equivalents.

We claim:

1. A composition for dispersing oil slicks consisting essentially of:
   from about 65 to 75 weight percent of a blend of a fatty acid sorbitan monoester said fatty acid is an aliphatic monocarboxylic acid containing from 10 to 20 carbon atoms, a polyalkyleneoxide adduct of a fatty acid sorbitan monoester and a 75% aqueous solution of an alkaline salt of a dialkylsulfosuccinate, the weight percentage of said salt, based on dry salt and on dry blend, being from about 35 to about 40 percent and the weight ratio of said fatty acid sorbitan monoester to said adduct being from about 60:40 to about 40:60, said blend having an HLB in the range from about 9 to about 10.5 and
   from about 35 to 25 weight percent of a hydrocarbon-free solvent mixture of water and a monoether of a glycol, the weight ratio of water to said ether in said mixture being from about 60:40 to about 40:60, the total amount of water in said composition is 20 to 27.5 weight percent, and said composition has a viscosity in the range from about 475 to about 575 centistokes at −10° C.

2. A composition according to claim 1, wherein said fatty acid is oleic acid.

3. A composition according to claim 1, wherein said dialkylsulfosuccinate salt is the sodium salt of di(ethylhexyl)sulfosuccinate.

4. A composition according to claim 1, wherein said glycol monoether is a monoalkylether of a glycol selected from the group consisting of monoethylene glycol, diethylene glycol, monopropylene glycol and dipropylene glycol; said alkyl radical containing from 1 to 4 carbon atoms.

5. A composition according to claim 4, wherein said alkyl radical is a methyl radical.

6. A composition according to claim 4, wherein said alkyl radical is a butyl radical.

7. A composition according to claim 4, wherein said glycol monoether is selected from the group consisting of monoethylene glycol monobutyl ether, diethylene glycol monobutyl ether and diethylene glycol monomethyl ether.

8. A composition according to claim 1, wherein said blend has an HLB in the range from about 9.4 to about 10.5.

9. A composition for dispersing oil slicks consisting essentially of:
   from about 70 to 75 weight percent of a blend of oleic acid sorbitan monoester, a polyethyleneoxide adduct of oleic acid sorbitan monoester and a 75% aqueous solution of di(ethylhexyl)sulfosuccinate sodium salt, the weight percentage of said salt, based on dry salt and on dry blend, being from 35 to 40 percent and the weight ratio of oleic acid sorbitan monoester to said polyethylene oxide adduct being about 55:45, said blend having an HLB in the range from about 9 to about 10.5 and
   from about 30 to 25 weight percent of a hydrocarbon-free solvent mixture of water and a monoalkylether of a glycol selected from the group comprising monoethylene glycol and diethylene glycol and monopropylene glycol and dipropylene glycol in which the alkyl radical contains from 1 to 4 carbon atoms, the total amount of water in said composition is 20 to 27.5 weight percent, and said composition has a viscosity in the range from about 475 to 575 centistokes at −10° C.

10. A composition according to claim 9, wherein said alkyl radical is a methyl radical.

11. A composition according to claim 9, wherein said alkyl radical is a butyl radical.

12. A composition according to claim 9, wherein said glycol monoether is selected from the group consisting of monoethylene glycol monobutyl ether, diethylene glycol monobutyl ether and diethylene glycol monomethyl ether.

13. A composition according to claim 9, wherein said blend has an HLB in the range from about 9.4 to 10.5.

14. A method for dispersing an oil slick which comprises spraying said slick with an effective oil slick dispersing amount of a composition consisting essentially of:
   from about 65 to 75 weight percent of a blend of a fatty acid sorbitan monoester, said fatty acid is an aliphatic monocarboxylic acid containing from 10 to 20 carbons a polyalkyleneoxide adduct of a fatty acid sorbitan monoester and a 75% aqueous solution of an alkaline salt of a dialylsulfosuccinate, the weight percentage of said salt, based on dry salt and on dry blend, being from about 35 to about 40 percent and the weight ratio of said fatty acid sorbitan monoester to said adduct being from about 60:40 to about 40:60, said blend having an HLB in the range from about 9 to about 10.5 and
   from about 35 to 25 weight percent of a hydrocarbon-free solvent mixture of water and a monoether of a glycol, the weight ratio of water to said ether in said mixture being from about 60:40 to about 40:60, the total amount of water in said composition is 20 to 27.5 weight percent, and said composition has a viscosity in the range from about 475 to 575 centistokes at −10° C.

15. A method according to claim 14, wherein the fatty acid is oleic acid.

16. A method according to claim 14, wherein the alkaline salt of a dialkylsulfosuccinate is the sodium salt of di(ethylhexyl)sulfosuccinate.

17. A method according to claim 14, wherein the glycol monoether is a monoalkylether of a glycol selected from the group consisting of monoethylene glycol, and diethylene glycol, monopropylene glycol and dipropylene glycol, the alkyl radical containing from 1 to 4 carbon atoms.

18. A method according to claim 17, wherein the alkyl radical is the methyl radical.

19. A method according to claim 17, wherein the alkyl radical is the butyl radical.

20. A method according to claim 17, wherein the glycol monoether is selected from the group consisting of the monobutyl ether of monoethylene glycol, the monobutyl ether of diethylene glycol and the monomethyl ether of diethylene glycol.

21. A method according to claim 14, wherein said blend has an HLB in the range from about 9.4 to about 10.5.

22. A method for dispersing an oil slick which comprises spraying said slick with an effective oil slick dispersing amount of a composition consisting essentially of:
from about 70 to 75 weight percent of a blend of oleic acid sorbitan monoester, a polyethyleneoxide adduct of oleic acid sorbitan monoester and a 75% aqueous solution of di(ethylhexyl)sulfosuccinate sodium salt, the weight percentage of said salt, based on dry salt and on dry blend, being from 35 to 40 percent and the weight ratio of oleic acid sorbitan monoester to its polyethylene oxide adduct being about 55:45, said blend having an HLB in the range from about 9 to about 10.5 and
from about 30 to 25 weight percent of a hydrocarbon-free solvent mixture of water and a monoalkylether of a glycol selected from the group consisting of monoethylene glycol, diethylene glycol, monopropylene glycol and dipropylene glycol, the alkyl radical containing from 1 to 4 carbon atoms, the total amount of water in said composition is 20 to 27.5 weight percent, and said composition has a viscosity in the range from about 475 to 575 centistokes at $-10°$ C.

23. A method according to claim 22, wherein said glycol monoether is a monoalkylether of a glycol selected from the group consisting of monoethylene glycol, diethylene glycol, monopropylene glycol and dipropylene glycol; said alkyl radical containing from 1 to 4 carbon atoms.

24. A method according to claim 23, wherein said alkyl radical is a methyl radical.

25. A method according to claim 23, wherein said alkyl radical is a butyl radical.

26. A method according to claim 23, wherein said glycol monoether is selected from the group consisting of monoethylene glycol monobutyl ether, diethylene glycol monobutyl ether and diethylene glycol monomethyl ether.

27. A method according to claim 22, wherein said blend has an HLB in the range from about 9.4 to 10.5.

* * * * *